United States Patent [19]

Adams

[11] 4,192,342
[45] Mar. 11, 1980

[54] ROD OUT VALVE

[76] Inventor: Donald L. Adams, P.O. Box T, Tulia, Tex. 79088

[21] Appl. No.: 878,617

[22] Filed: Feb. 16, 1978

[51] Int. Cl.² .......................... G01F 15/12; B08B 9/02; F16K 31/46
[52] U.S. Cl. ............................... 137/245.5; 73/205 R; 73/756; 251/293; 251/330
[58] Field of Search ...................... 137/242, 244, 245.5; 251/293, 330

[56] References Cited

U.S. PATENT DOCUMENTS

| 232,724 | 9/1880 | Jenkins | 137/245.5 |
| 796,111 | 8/1905 | Canfield | 251/293 |
| 837,035 | 11/1906 | Butler | 137/245.5 |
| 1,426,272 | 8/1922 | Banks | 74/557 X |
| 1,467,492 | 9/1923 | Olson | 137/245.5 |
| 2,732,855 | 1/1956 | Hobbs | 251/330 X |

*Primary Examiner*—Martin P. Schwadron
*Assistant Examiner*—Richard Gerard
*Attorney, Agent, or Firm*—Wendell Coffee

[57] ABSTRACT

A valve connects the duct leading from a process pipe to a flow transmitter, pressure gauge or sampling analyzer. The valve stem of the valve is hollow and aligned with the duct through the connection to process fluid. A cleaning rod is telescoped within the hollow stem so that it may be forced through the duct to clean debris from the duct. Also the valve handle has capstan holes therein for mechanical advantage. Furthermore, a bonnet valve seat is used so that the bonnet packing may be removed while the equipment is pressurized.

1 Claim, 2 Drawing Figures

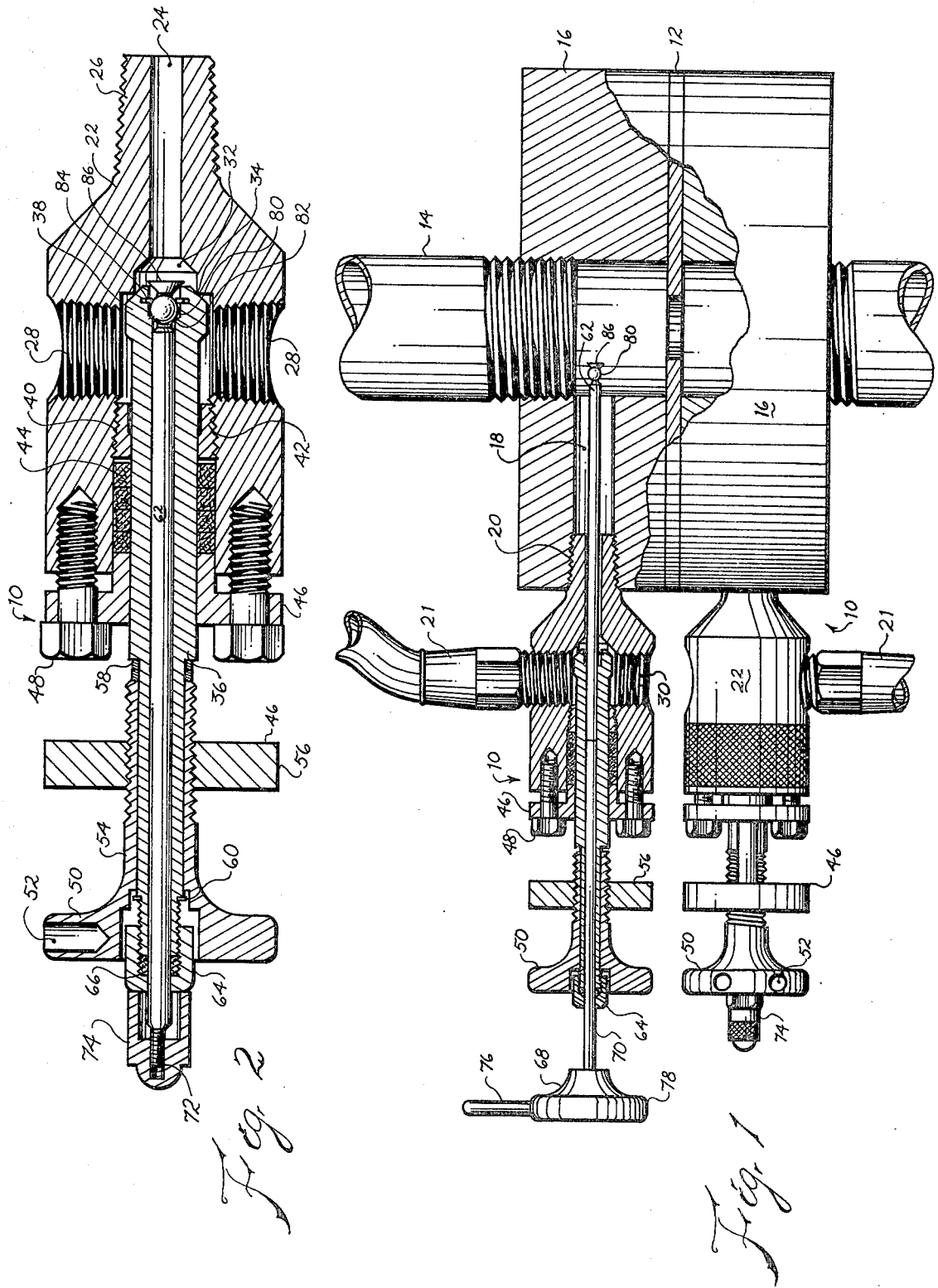

ROD OUT VALVE

BACKGROUND OF THE INVENTION

1. Field of the Invention

This invention relates to manually operated valves and more particularly to small valves used in processing equipment.

2. Description of the Prior Art

Valves are often used to interconnect a flow transmitter and a flow measuring device such as a thin plate orifice. Also valves are used to connect process pipes to pressure gauges or sample analyzers. Since there is no fluid flow through these valves, (except sample analyzers) foreign matter, polymerized fluid or other debris will often block the duct connecting these valves and the conduit containing the thin plate orifice.

Before my invention the debris blocking this duct was removed in one or two ways. The first was to remove the valve and then force a cleaning rod through the duct. The second was to remove the valve stem and then force a cleaning rod through the valve body and the duct. Whichever method was employed, the fluid escaped from the conduit. If the fluid was hot, under high pressure, or toxic, safety consideration forced the personnel engaged in the cleaning operation to stop the flow of fluid through the conduit and perhaps to drain the conduit before beginning the cleaning operation. This often resulted in stopping a processing unit.

SUMMARY OF THE INVENTION

1. New and Different Function

I have discovered that the problems of the prior art are eliminated by using a valve having a hollow stem to interconnect the measuring device and the conduit. A permanent cleaning rod is telescoped inside the hollow stem. An extender section is attached to the cleaning rod to force the cleaning rod through the duct connecting the valve to the conduit.

A second valve seat is located inside the hollow stem so that a ball valve on the cleaning rod contacts this seat when the cleaning rod is fully retracted into the hollow stem. Thus, fluid will be prevented from leaking through the clearance between the cleaning rod and the bore of the hollow stem. The cleaning rod valve is forced against this seat by fluid pressure as well as mechanical means. Further protection against leakage is obtained by installing packing material between the cleaning rod and the valve stem bore.

In addition, a third valve seat is located in the bonnet opening in the valve body so that the valve member will contact this seat when the valve is fully open. When the valve is forced against this seat, packing material may be removed and re-installed around the stem.

These features enable the routine maintenance outlined below to be conducted without interrupting the fluid flow.

The cleaning rod may be operated to clear debris from the connecting valve and the duct.

The seat contained inside the valve stem permits the packing installed between the cleaning rod and the bore of the hollow valve stem to be replaced when the cleaning rod is fully retracted into the valve stem.

In a similar manner the added valve seat located inside the valve body enables the bonnet packing to be replaced when the valve is fully open.

Furthermore, the main operating valve handle has a series of holes or bores therethrough similar to a capstan. Therefore, a pin may be inserted into the handle to give the necessary grip for mechanical advantage to turn the handle.

It may be seen that the function of the combination of my invention is far greater than the sum of the functions of the individual parts such as the rods, ball-shaped valves, seats, packing, etc.

2. Objects of the Invention

An object of this invention is to provide a valve for connection to a measuring duct.

Another object is to produce such a valve upon which all routine maintenance may be performed without interrupting the fluid flow.

Further objects are to achieve the above with a device that is sturdy, compact, durable, lightweight, simple, safe, efficient, versatile, ecologically compatible, energy conserving, and reliable, yet inexpensive and easy to manufacture, install, operate and maintain.

Other objects are to achieve the above with a method that is versatile, ecologically compatible, energy conserving, rapid, efficient, and inexpensive, and does not require skilled people to install, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a side view of the invention with parts broken away as embodied in a typical thin plate orifice flow rate measuring system.

FIG. 2 is a sectional view of the valve of this invention.

DESCRIPTION OF THE PREFERRED EMBODIMENT

Two valves 10, according to this invention, are shown in FIG. 1 as being used in connection with a thin plate orifice 12. As typical in such installation, the orifice plate 12 within conduit 14 is between two flanges 16. Each flange has duct 18 within it and the bottom of the valve is threaded into threaded top 20 of the duct.

A typical example of the use of valves according to this invention is to connect the conduit 14 having the thin plate orifice thereto to a manometer. Hoses 21 from the valves 10 are connected to the manometer in the installation as shown in FIG. 1. However, it will be understood that this could be one of any number of types of installations. E.g., the purpose of an installation could be to obtain a sample from the fluid within the conduit 14. In this regard, the conduit 14 could be a vessel or any other piece of processing equipment having fluid therein. Therefore, the use of the term conduit in this application, including the claims, is intended to have the broadest possible meaning of any fluid container. However, in each case, according to this invention, there will be a duct such as duct 18 leading from the interior of the conduit to the valve connected thereto. Also in this application, the general term "testing" is to indicate testing in its broadest sense which would include sampling as well as pressure measurement as shown in FIG. 1.

It will be noted in FIG. 1 that particularly in installations with orifices, each of the valves are placed very close to another valve so that it is essential for installation and removal that the diameter of the valve be at a minimum and no part of the valve can exceed this diameter.

The valve 10 includes valve body 22. The valve body has inlet port 24 which is surrounded by the threaded nipple 26 which, as shown in FIG. 1, is threaded into the top of the duct 18, although the valve body could be fluidly connected to the duct by other means.

The valve body is illustrated having two opposing outlet ports 28. One of these outlet ports is meant to be closed by plug 30 and the other attached to an outlet conduit such as hose 21. Fluid chamber 32 is within the valve body and fluidly connects the inlet port 24 and the outlet ports 28.

Main valve seat 34 is located at the inlet side of the chamber and, therefore, it may be seen that it is on the valve body 22 between the chamber and the duct 18, which is also to say that it is between the chamber 32 and the inlet port 24. With hollow valve stem 36 in the closed position, main valve member 38 will close the inlet port 24 and prevent fluid from the duct 18 from entering the valve chamber 32.

The valve body 22 has a bonnet opening from the chamber opposite the inlet port 24. The bottom of this opening is threaded at 40 with tapered pipe threads (N.P.T.). Removable bonnet valve seat 42, also having tapered threads, is threaded therein. It may be seen that the seat 42 is inserted after the stem 36 is in place. With the main valve member 38 in the full open position and engaging the seat 42, the flow of fluid will be blocked between the chamber 32 and the bonnet opening.

The hollow valve stem 36 is sealed to the valve body 22 by bonnet packing 44 within the bonnet opening above bonnet valve seat 42. It will be understood that other types of seals may be used instead of packing. The bonnet packing 44 is held securely in place by bonnet packing retainer 46 which is held in place by bonnet studs 48.

If the valve member 38 is lifted by the hollow valve stem 36 to a closed position it will form a seal to maintain the chamber 32 closed. Therefore, the packing 44 may be removed, replaced, maintained and serviced with pressurized fluid within the conduit 14.

Valve handle 50 has a circular periphery. As stated before, it is necessary for this valve handle to have a small diameter so that two valves may be placed close together. However, it is sometimes necessary to be able to turn the valve handle 50 with considerable force. Therefore, I have drilled radial capstan holes 52 through the circular perimeter of the handle 50 so that a pin may be inserted therein giving the mechanical advantage for grip and leverage necessary to tighten or loosen the valve handle.

The handle 50 extends down the threaded neck 54. This threaded neck 54 is threaded to drive plate 56 or top portion of the bonnet packing retainer 46. Referring to the bottom valve of FIG. 1, it may be seen that the bonnet packing retainer 46 is somewhat spool-like, having a portion with the actual retainer on the bottom portion and upper portion or drive plate 56 being internally threaded so that the handle 50 threads therein The hollow stem 36 has a shoulder 58 with a washer between the shoulder 58 and the bottom of the threaded neck 54. Therefore, it may be seen that when the handle 50 is down, the neck 54 will force the hollow stem 36 down, thereby pressing the valve member 38 against the valve seat 34.

Retaining ring 60 is on top of the valve stem. The ring 60 is immediately above an internal notch on the top of threaded neck 54. Therefore, it may be seen that when the handle 50 is up, it pulls with it the hollow valve stem 36 and will force the valve member 38 against the bonnet valve seat 42. A small self locking nut could be used instead of ring 60. As previously stated, when the valve member 38 is against the bonnet valve seat 42, the packing 44 may be removed and replaced.

Cleaning rod 62 is telescoped within the hollow valve stem 36. The top of the hollow stem 36 is threaded and packing cap 64 is threaded therearound to hold stem packing 66 in place. The stem packing 66 forms a seal between the stem 36 and the rod 62. A cleaning rod extender tool 68 has extension rod 70 thereon. The extension rod has the same diameter as the cleaning rod 62. The extension rod has a bore and internal threads at the bottom end thereof which are adapted to engage threaded tip 72 on the top of the cleaning rod 62. The threaded tip 72 is on the top of the cleaning rod 62. The threaded tip is normally protected by protection nut 74 which is placed over the threaded tip 72 when the extension tool 62 is not in place. Thus the extension rod 70 will slide through the packing 66 and retain the seal.

I have found it convenient to provide the cleaning tool 68 with pin 76 from handle 78 of proper diameter to be used with capstan holes 52. Therefore, a worker with the single tool 68 can use this tool to open or tighten the valve handle 50 as well as operate the cleaning rod 62.

The end of the cleaning rod is provided with ball-shaped stem valve 80. When the cleaning rod 62 is fully telescoped in the stem as shown in FIG. 2, the stem valve 80 seats against stem valve seat 82. It will be understood that the protection cap 74 in addition to protecting the threaded tips 72 also holds the stem valve 80 firmly against the stem valve seat 82. Also, retaining ring 84 in the bottom of the enlarged bore on the bottom of the hollow stem 36 holds the ball valve 80 in position. Scraper cup 86 is on the exteme end of the cleaning rod 62 and it aids in cleaning or rodding out the inlet port 24 and the duct 18.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claim. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| 10 valve | 48 studs |
| 12 plate | 50 valve handle |
| 14 conduit | 52 capstan hole |
| 16 flanges | 54 threaded neck |
| 18 duct | 56 drive plate |
| 20 threaded top | 58 shoulder |
| 21 hose | 60 retainer |
| 22 body | 62 cleaning rod |
| 24 inlet port | 64 packing cap |
| 26 threaded | 66 stem packing |
| 28 out port | 68 extension tool |
| 30 plug | 70 extension rod |
| 32 fluid chamber | 72 threaded tip |
| 34 main valve seat | 74 cap |
| 36 hollow valve stem | 76 pin |
| 38 main valve member | 78 handle |

-continued

| | |
|---|---|
| 40 bonnet threads | 80 stem valve |
| 42 bonnet valve seat | 82 stem valve seat |
| 44 bonnet packing | 84 retaining ring |
| 46 bonnet packing retainer | 86 scraper cup |

I claim as my invention:

1. In a station for testing fluid in a conduit including
   a. a duct extending into the conduit,
   b. a valve fluidly connected to the duct having
      (i) a valve body with
      (ii) a fluid chamber,
      (iii) a valve stem in the body,
      (iv) a bonnet seal between said stem and body,
      (v) a valve member on the end of the stem in the chamber, and
      (vi) a valve seat on the body between the chamber and the duct;
   the improved structure for cleaning debris from the duct comprising in combination with the above:
   c. said valve stem being hollow,
   d. a cleaning rod telescoped within said valve stem and valve member,
   e. a stem seal between said cleaning rod and said valve stem,
   f. extension means on the rod for forcing said cleaning rod into and said duct thereby pushing any debris within the duct out of the duct,
   g. a valve seat on the valve stem,
   h. a stem valve on the rod adapted to engage said stem valve seat, whereby the rod is sealed to the stem when the rod is fully telescoped within the stem,
   j. a retaining ring on the valve stem which contacts the stem valve to hold the rod fully telescoped,
   k. a bonnet seat around the valve stem threaded into the body with tapered threads between the chamber and the bonnet seal, whereby said valve member may be seated on said bonnet valve seat and the bonnet seal removed without leakage of fluid from the chamber,
   l. a valve handle journalled around the valve stem and having a circular periphery threaded to said valve body,
   m. radial holes through the outer periphery of the handle, whereby a pin may be inserted in one of said radial holes to obtain leverage in turning the handle,
   n. diametrically opposed threaded outlet ports in valve body from the chamber,
   o. a plug in one outlet port, and
   p. a fluid conduit in the other port.

* * * * *